May 1, 1928.
H. B. LINDLEY
AUTOMOBILE STOPPING DEVICE
Filed Aug. 21, 1926
1,668,279
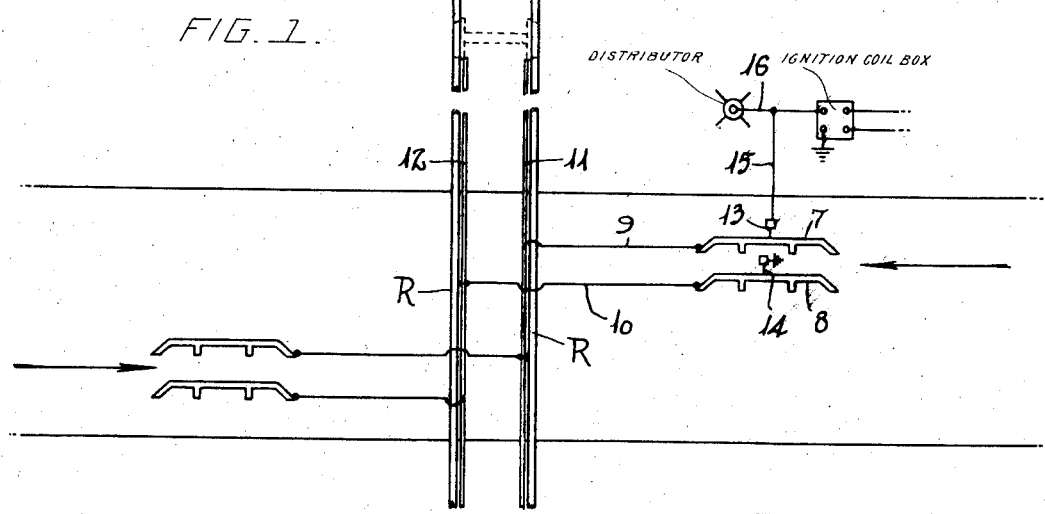
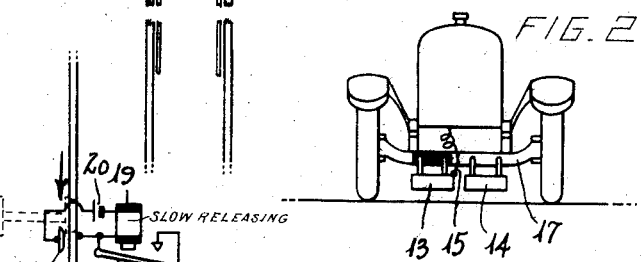
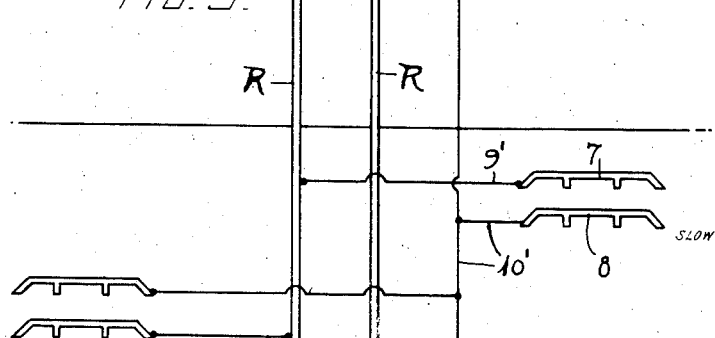
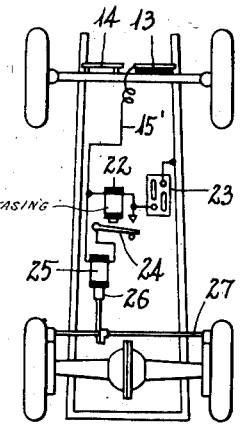
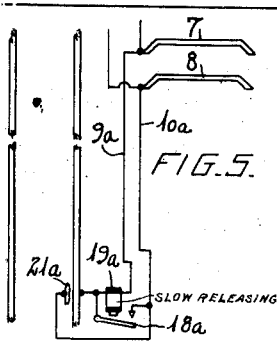
Inventor:
H. B. Lindley
By Monroe E. Miller
Attorney.

Patented May 1, 1928.

1,668,279

UNITED STATES PATENT OFFICE.

HUGH BYRON LINDLEY, OF HATTIESBURG, MISSISSIPPI.

AUTOMOBILE STOPPING DEVICE.

Application filed August 21, 1926. Serial No. 130,611.

The present invention relates to apparatus for automatically stopping an automobile or motor vehicle when approaching a railroad crossing with a train on the track near the crossing, in order to avoid accidents and collisions.

It is the object of the invention to provide an apparatus of the character indicated which is simple in construction and operation.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Fig. 1 is a diagrammatical view of one form of apparatus.

Fig. 2 is a front view of an automobile showing the contact plates or members thereon.

Fig. 3 is a diagrammatical view illustrating a modification in the trackside installation.

Fig. 4 is a diagrammatical view illustrating a modification in the automobile or motor vehicle equipment.

Fig. 5 is a diagrammatical view illustrating a further modification in the trackside installation.

In carrying out the invention a pair of ramps 7 and 8 of any suitable kind is mounted on the road or pavement at each side of the railroad track or tracks in the path of vehicles approaching the railroad crossing, in order that the vehicles will pass over said ramps. The ramps 7 and 8 are connected by wires or conductors 9 and 10 with contact rails or bars 11 and 12 extending along the rails R of the track, whereby the wheel flanges of a train will contact with the rails 11 and 12 for bridging same and thereby connecting the conductors 9 and 10 and ramps 7 and 8 electrically. In some cases the conductors 9 and 10 could be connected directly to the traffic rails R so that the trucks of the cars will bridge the conductors 9 and 10.

The automobiles or motor vehicles, in order to be protected against collision at the railroad crossing, are provided with means to contact with the ramps 7 and 8 for stopping the vehicles when approaching the railroad track with a train moving along the rails or bars 11 and 12. Each motor vehicle is equipped with contact plates, brushes or shoes 13 and 14 to move over the ramps 7 and 8 in contact therewith when the vehicle approaches the railroad track. The plate 14 is electrically connected with the frame of the vehicle so as to be grounded to the frame, while the plate 13 is insulated from the vehicle frame and is connected by a wire or conductor 15 with the ignition system, such as the wire 16 connecting the ignition coil box and distributor, in order to ground the ignition system when the motor vehicle moves over the ramps 7 and 8 with a train on the track near the crossing. As shown, the plates or contact members 13 and 14 are suspended from the front axle 17 of the motor vehicle, as seen in Fig. 2.

When a train is on the track with the wheel flanges engaging the contact rails or bars 11 and 12, the ramps 7 and 8 are bridged, thereby grounding the ignition system of an automobile whose contact plates 13 and 14 are positioned on the ramps 7 and 8, by way of the conductor 15, plate 13, ramp 7, conductor 9, contact rail 11, wheel trucks of the train, contact rail 12, conductor 10, ramp 8, plate 14 and motor vehicle frame. This will prevent ignition in the engine of the motor vehicle, thereby stopping the vehicle, and the ramps 7 and 8 may be of sufficient length so that the vehicle will stop by itself after moving several feet and before the plates 13 and 14 are removed from the ramps. When there is no train on the track along the contact rails or bars 11 and 12, the bridge between the ramps 7 and 8 is opened, so that the motor vehicle may proceed without interference across the railroad track.

As shown, the apparatus is used with a single track, but it will be apparent that same may be used with a plurality of tracks each of which is equipped with the contact rails or bars 11 and 12 to which the conductors 9 and 10 are connected.

Fig. 3 illustrates a modified means for bridging the ramps 7 and 8 when a train approaches the crossing. The conductor 9' leading from the ramp 7 is connected to one traffic rail R, and the conductor 10' leading from the other ramp 8 is connected through switches 18 with the other rail R, and said switches are normally open so as to break the connection between the ramps 7 and 8. The switches 18 are under the influence of electromagnets 19 which are connected in circuits with batteries 20 or other sources of electrical energy and contact or switch means 21 of any suitable kind adapted to be operated or closed by the train wheels when the train is approaching the crossing, in the direction of the arrows. As shown in dotted lines in Fig. 3, the wheel flanges bridge the gaps between the contacts 21 and corresponding rail R, for closing the circuits of the magnets 19, but any other suitable means may be employed for energizing the magnets 19 and closing the switches 18 when trains approach the crossing. The magnets 19 are slow releasing in order to keep the switches 18 closed for a predetermined length of time after the train has passed.

Thus, when a train approaches the crossing from either direction, the corresponding magnet 19 is energized so as to close its switch 18, thereby bridging the ramps 7 and 8. As shown, the trucks of the train bridge the rails R, but the conductor 9' may be connected to the same rail as that to which the switches 18 are connected, so as not to interfere with the track circuits of wayside signal apparatus. When a magnet 19 is energized it remains energized to hold the switch 18 closed for a predetermined period of time, sufficient to allow the train to reach the crossing before the bridge between the ramps 7 and 8 is opened. The contact or switch means 21 are preferably such as to be operated only by trains approaching the crossing from either direction, thereby avoiding unnecessary stopping of automobiles as the trains leave the crossing.

Fig. 4 illustrates a vehicle equipment operable for automatically applying the brakes for stopping the vehicle when the contact plates or members 13 and 14 are bridged by the ramps and partial trackside circuit. Thus, the plate 13 is connected by a conductor 15' with an electromagnet 22 that is connected to the storage battery 23 of the vehicle, which battery has one pole grounded to the vehicle frame as usual. When the plates 13 and 14 move over the ramps 7 and 8 with the bridge between the ramps closed, the magnet 22 is energized so as to close a switch 24 for connecting a brake operating electromagnet or solenoid 25 in series with the switch 24 between the battery 23 and conductor 15', so that the solenoid 25 is energized. The core 26 of the solenoid is operably connected to the emergency brake 27 of the vehicle so as to apply the emergency brake and stop the vehicle when the magnet 22 and solenoid 25 are energized. The magnet 22 is preferably slow releasing so as not to release the switch 24 and brakes until after the connection between the ramps 7 and 8 has been broken for a predetermined interval of time, thereby preventing the automobile from being started until the train has reached or passed the crossing.

The ignition grounding means shown in Fig. 1 may be used with the brake applying means shown in Fig. 4, so that the ignition is grounded and the brake applied simultaneously.

Fig. 5 illustrates a modification of the track-side installation shown in Fig. 3, inasmuch as the track battery 20 is eliminated and the vehicle battery 23 employed for energizing the electromagnet 19ª. The conductor 9ª leading from the ramp 7 is connected to the magnet 19ª, and the conductor 10ª leading from the ramp 8 is connected to the contact or switch means 21ª operated by the wheels of the trains. The magnet 19ª and switch 18ª are connected to the rail R of the track, and the switch 18ª, when closed, bridges the contact or switch means 21ª, the magnet being slow-acting so that the switch 18ª will remain closed for a suitable interval after the magnet has been deenergized. Thus, when the contact or switch means 21ª is closed by a train approaching the crossing, should a vehicle be moving over the ramps 7 and 8, with the vehicle equipped as shown in Fig. 4, the current from the vehicle battery 23 will flow through the partial vehicle circuit including the contact plate 13, conductor 15', magnet 22, battery 23, vehicle frame and plate 14, thereby energizing the magnet 19ª which is located in a partial trackside circuit including the ramp 7, conductor 9ª, magnet 19ª, contact or switch means 21ª closed by the train wheels, conductor 10ª and ramp 8. The battery 23 of the motor vehicle thus supplies the energy for energizing the magnet 19ª, without using a trackside battery, and when the magnet 19ª has been energized to close the switch 18ª, the switch 18ª will bridge the contact or switch means 21ª so that after said contact or switch means opens, the switch 18ª will connect the conductors 9ª and 10ª to keep the bridge across the ramps 7 and 8 closed for an interval of time sufficiently long to permit the train to reach the crossing. Thus, the motor vehicle battery supplies the energy for closing the trackside bridging connection between the ramps, and also supplies the energy for applying the motor vehicle brake should the contact or switch means 21ª have been closed by the approach of a train to the crossing simultaneously with the movement of the motor vehicle over the ramps 7 and 8.

The ramps 7 and 8 may be of sufficient length so that when a motor vehicle is approaching the crossing within a reasonable distance therefrom and at a rational speed, the contact plates of the vehicle will be riding on the ramps, so that a train approaching the crossing will result in the vehicle being stopped. If the train has already passed the contact or switch means 21ᵃ before the motor vehicle reaches the ramps, then the train, moving at ordinary or fast speed, will reach the crossing before the motor vehicle can do so when moving at a rational speed. If the motor vehicle moves over the ramps before the train reaches the contact or switch means 21ᵃ, then the distances are such that the motor vehicle has time to pass over the crossing, after leaving the ramps, before the train can reach the crossing.

Having thus described the invention, what is claimed as new is:—

1. The combination with a railroad track, of a pair of ramps arranged in the path of a vehicle when approaching the track on a road, contact means on the track at a distance from said road and adapted for cooperation with a train approaching said road, and means controlled by said contact means and operable for connecting said ramps electrically for a predetermined interval after the cooperation of said contact means with a passing train.

2. The combination with a railroad track, of a pair of ramps arranged in the path of a vehicle when approaching the track on a road, contact means spaced from the rails of the track at a distance from said road and adapted for the engagement of train carried members, and means controlled by said contact means and operable for connecting said ramps electrically for a predetermined interval after said members engage said contact means.

In testimony whereof I hereunto affix my signature.

HUGH BYRON LINDLEY.